(12) United States Patent
Gershtein et al.

(10) Patent No.: US 7,076,969 B2
(45) Date of Patent: *Jul. 18, 2006

(54) SYSTEM FOR SUPPLY AND DELIVERY OF HIGH PURITY AND ULTRAHIGH PURITY CARBON DIOXIDE

(75) Inventors: Vladimir Yliy Gershtein, Allentown, PA (US); Paul Anthony Mattiola, Coopersburg, PA (US); John Frederick Cirucci, Schnecksville, PA (US); John Christopher Ivankovits, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 90 days.

This patent is subject to a terminal disclaimer.

(21) Appl. No.: 10/760,771

(22) Filed: Jan. 19, 2004

(65) Prior Publication Data

US 2005/0155378 A1    Jul. 21, 2005

(51) Int. Cl.
*F25J 3/00*        (2006.01)
(52) U.S. Cl. .......................................... 62/617; 62/928
(58) Field of Classification Search ................. 62/617, 62/602, 48.1, 928, 54.2
See application file for complete search history.

(56) References Cited

U.S. PATENT DOCUMENTS

| | | | |
|---|---|---|---|
| 2,551,399 A | 5/1951 | Silverberg | |
| 3,317,278 A | 5/1967 | Siegfried et al. | |
| 4,699,642 A * | 10/1987 | Perry et al. | 62/541 |
| 5,237,824 A * | 8/1993 | Pawliszyn | 62/51.1 |
| 5,377,705 A | 1/1995 | Smith, Jr. et al. | |
| 5,772,783 A | 6/1998 | Stucker | |
| 5,894,742 A | 4/1999 | Charles et al. | |
| 5,908,510 A | 6/1999 | McCullough et al. | |
| 6,023,933 A | 2/2000 | Langan et al. | |
| 6,327,872 B1 * | 12/2001 | Boyd et al. | 62/636 |
| 6,612,317 B1 * | 9/2003 | Costantini et al. | 134/58 R |
| 6,688,115 B1 * | 2/2004 | Gershtein | 62/54.1 |
| 2003/0161780 A1 * | 8/2003 | Howard et al. | 423/437.1 |
| 2005/0155377 A1 * | 7/2005 | Gershtein | 62/534 |

FOREIGN PATENT DOCUMENTS

| | | |
|---|---|---|
| JP | 2002327895 | 11/2002 |
| WO | WO 03/033114 A1 | 4/2003 |
| WO | WO 03/033428 A1 | 4/2003 |

* cited by examiner

*Primary Examiner*—William C. Doerrler
(74) *Attorney, Agent, or Firm*—Rosaleen P. Morris-Oskanian

(57) ABSTRACT

A system for the supply and delivery of a high or a ultrahigh purity (UHP) carbon dioxide product stream to at least one process tool within a manufacturing facility and method comprising same is disclosed herein. In one embodiment, the system is comprised of the following sub-systems: a carbon dioxide source, a carbon dioxide delivery system, and the point of use (POU) containing at least one process tool.

31 Claims, 5 Drawing Sheets

Example of an Onsite Bulk UHP CO₂ Tank-To-Tool Handling System with Recycle and Purification.

Example of an Onsite UHP $CO_2$ Tank-To-Tool Handling System without Purification Example of an Onsite UHP $CO_2$ Tank-To-Tool Handling System with Purification Example of an Onsite Bulk UHP $CO_2$ Tank-To-Tool Handling System with Recycle.

Example of an Onsite Bulk UHP $CO_2$ Tank-To-Tool Handling System with Recycle and Purification.

Example of an Onsite Bulk UHP $CO_2$ Tank-To-Tool System with Recycle and Dedicated Recycle Purification System

SYSTEM FOR SUPPLY AND DELIVERY OF HIGH PURITY AND ULTRAHIGH PURITY CARBON DIOXIDE

BACKGROUND OF THE INVENTION

Highly pressurized carbon dioxide fluids such as liquid, gaseous, or supercritical $CO_2$ (e.g., at or above 31° C. and 1,071 pounds per square inch gauge (psig)) are required for a variety of industrial processes. In certain instances, gaseous, liquefied, or supercritical carbon dioxide may be seen as a replacement for organic solvents or aqueous-based process solutions that are currently in use as cleaning or processing solutions.

Many cleaning or processing applications in the electronic industry may demand the use of carbon dioxide fluids at high flow rates and high pressures. One of the methods for achieving high pressure carbon dioxide has been to pump liquid carbon dioxide to a required pressure. However, pumping liquid carbon dioxide to a high pressure can introduce contaminants, such as particulates, hydrocarbons, halocarbons, etc., to the fluid stream.

Certain industries such as semiconductor manufacturing require high pressure carbon dioxide fluids delivered to a process tool or point of use (POU) at a high or an ultra high purity (UHP) levels, i.e., having low parts per million (ppm) or low parts per billion (ppb), respectively, of contaminants. Small quantities of contaminants are detrimental to the microchip fabrication process in the manufacturing of semiconductor electronic components. Contaminants, in the form of particulates, films, or molecules, can cause a variety of defects, such as short circuits, open circuits, and silicon crystal stacking faults. These defects can cause the failure of the finished component, such as integrated circuits, and these failures can cause significant yield reductions, which greatly increases manufacturing costs. Because of this, cleaning is the most frequently repeated step in the manufacture of integrated circuits. At the 0.18-micrometer design rule, 80 of the approximately 400 total processing steps in the manufacture of an integrated circuit are typically cleaning steps. Substrates typically are cleaned after every contaminating process step and before each high temperature operation to ensure the quality of the integrated circuit.

Semiconductor-applications can generally produce a range of contaminants. Contaminants may be introduced into the carbon dioxide fluid from many sources such as residues from manufacturing process steps such as lithography, etching, stripping, and chemical mechanical planarization (CMP); particulates either indigenous to and/or resulting from manufacturing processes; inorganic particulates or materials such as native or chemical oxides, metal-containing compounds; and contaminants introduced from manufacturing equipment such as pumps, compressors, or other sources. These contaminants can have a vapor pressure either above or below that of carbon dioxide. Higher vapor pressure contaminants may be, for example, fluorine, lower molecular weight fluorinated hydrocarbons, or atmospheric gases such as nitrogen and oxygen. Certain contaminants such as, for example, photoresist residue may be difficult to remove from the carbon dioxide fluid because they are non-volatile.

Current market demands of high and UHP carbon dioxide fluids are satisfied using cylinder supply and represent a limited development activity for semiconductor manufacturers. However, as semiconductor manufacturers increasingly adopt high and UHP carbon dioxide as a replacement for aqueous-based process solutions, larger scale or bulk $CO_2$ supply systems will be needed. Typical bulk $CO_2$ supply systems, that are used to deliver and store $CO_2$ in other industries, such as food manufacturing, are operated at a pressure of about 300 psia and a temperature varying from about −15° F. to 2° F. (−26° C. to −17° C.). Further, these industries do not necessarily require a high or a ultra-high purity (UHP) product. The semiconductor industry, by contrast, requires high or UHP $CO_2$ delivered to the process tool used in various processes such as photo-resist removal, deposition, lithography, etc., at significantly higher pressures. The required product pressure at these process tools could vary from 2,000 psig to 10,000 psig. Pressure requirements depend on many factors such as application specifics, tool design, process philosophy, etc.

The semiconductor industry faces significant technical challenges developing onsite systems that will handle high and UHP $CO_2$ from bulk sources to process tools. Some of these challenges include, but are not limited to, storage of high and UHP $CO_2$ in large quantities at high pressures; purity maintenance within the onsite high and UHP $CO_2$ handling system; liquid product delivery via long pipelines; and liquid product delivery to POU or process tool at pressures above 900 psig.

BRIEF SUMMARY OF THE INVENTION

A system for the bulk supply and delivery of an ultrahigh purity (UHP) carbon dioxide to at least one process tool at a required pressure within a manufacturing facility and method comprising same is disclosed herein. The term "required pressure" as used herein relates to customer's operating pressure or the pressure required for a particular operation. In one aspect of the present invention, there is provided a system for supplying a purified carbon dioxide product stream to at least one process tool at a required pressure comprising: (a) a carbon dioxide source comprising: a bulk storage vessel having a carbon dioxide feed that is selected from a purified carbon dioxide feed or an unpurified carbon dioxide feed wherein the pressure of the carbon dioxide feed within the vessel is at a first pressure which is below the critical pressure of carbon dioxide and is below the required pressure; (b) a carbon dioxide delivery system in fluid communication with the carbon dioxide source and the at least one process tool comprising a pressure elevating device that increases the pressure of the at least a portion of the purified carbon dioxide to provide a purified carbon dioxide product stream at a second pressure that is equal to or greater than the required pressure; and (c) the at least one process tool wherein the at least one process tool receives the purified carbon dioxide product stream at the required pressure and converts at least a portion of the purified carbon dioxide product stream to a spent carbon dioxide stream.

In another aspect of the present invention, there is provided a system for supplying a purified carbon dioxide product stream to at least one process tool at a required pressure, comprising: (a) a carbon dioxide source comprising: (i) a bulk storage vessel having an unpurified carbon dioxide feed wherein the pressure of the unpurified carbon dioxide feed within the vessel is at a first pressure which is below the critical pressure of carbon dioxide and is below the required pressure; (ii) optionally a temperature control system wherein the temperature control system maintains the carbon dioxide feed within the vessel at one or more temperatures ranging from about −23° C. to about 30° C.; and (iii) optionally a vaporizer; (b) a first purification system that is in fluid communication with the carbon dioxide source and a carbon dioxide delivery system wherein the first purification system coverts at least a portion of the unpurified carbon dioxide feed to a purified carbon dioxide feed prior to delivery to the carbon dioxide delivery system; (c) a carbon dioxide delivery system in fluid communication with the carbon dioxide source and the at least one process tool comprising: (i) optionally a low pressure storage vessel that stores at least a portion of the purified carbon dioxide feed at the first pressure; (ii) a pressure elevating device that increases the pressure of the at least a portion of the purified carbon dioxide feed to provide at least one selected from a purified carbon dioxide product stream or a partially purified carbon dioxide product stream wherein the purified carbon dioxide product stream and the partially purified product stream are at a second pressure that is at or above the required pressure; (d) the at least one process tool wherein the at least one process tool receives the purified carbon dioxide product stream at the required pressure and converts at least a portion of the purified carbon dioxide product stream to a spent carbon dioxide stream; and (e) a second purification system in fluid communication with the carbon dioxide delivery system and the at least one process tool wherein the second purification system coverts at least a portion of the spent carbon dioxide stream to a purified carbon dioxide product stream prior to delivery to the at least one process tool.

In a further aspect of the present invention, a process for delivering a purified carbon dioxide product stream to at least one process tool at a required pressure, comprising: providing a bulk storage vessel having a purified carbon dioxide feed contained therein wherein the purified carbon dioxide feed is at a first pressure which is below the critical pressure of carbon dioxide and is below the required pressure and wherein the temperature of the carbon dioxide is at one or more temperatures ranging about −23° C. to about 30° C.; delivering at least a portion of the purified carbon dioxide feed to a vessel that stores at least a portion of the purified carbon dioxide feed at the first pressure; converting at least a portion of the purified carbon dioxide feed contained within the vessel to a solid phase carbon dioxide; converting at least a portion of the solid phase carbon dioxide to the purified carbon dioxide product stream until a second pressure is reached wherein the second pressure is at or above the required pressure; maintaining the second pressure within the vessel; and delivering the purified carbon dioxide product stream to the at least one process tool at the required pressure wherein the at least one process tool converts at least a portion of the purified carbon dioxide product stream to a spent carbon dioxide stream.

BRIEF DESCRIPTION OF SEVERAL VIEWS OF THE DRAWINGS

The foregoing and other objects and features of embodiments of the invention will be apparent from the following more particular description of the certain embodiments, as illustrated in the accompanying drawings. In the drawings, like reference characters refer to the same parts throughout different drawings. The drawings are not necessarily to scale.

DETAILED DESCRIPTION OF THE INVENTION

A system for the bulk supply and delivery of a high or an ultrahigh purity (UHP) carbon dioxide product stream to at least one process tool within a manufacturing facility and method comprising same is disclosed herein. The carbon dioxide product stream may comprise at least 80% or greater, at least 90% or greater, or at least 95% or greater carbon dioxide. The system generally consists of three sub-systems: a carbon dioxide source, a carbon dioxide delivery system, and the point of use (POU) containing at least one process tool. It is preferred that all equipment contained within each sub-system that are in contact with the carbon dioxide feed and product stream satisfy high and UHP product requirements. In this connection, all wetted parts should not react with the carbon dioxide feed or product stream and should not introduce any contaminants in various forms such as particles, metals, atmospheric gases, etc. Further, it is preferred that the various elements within each sub-system within the system be selected to withstand maximum design pressure, for example, 10,000 psig. Examples of various embodiments of the system of the present invention are provided in FIGS. 1, 2, 3, 4, 5, and 6.

Figure 1:
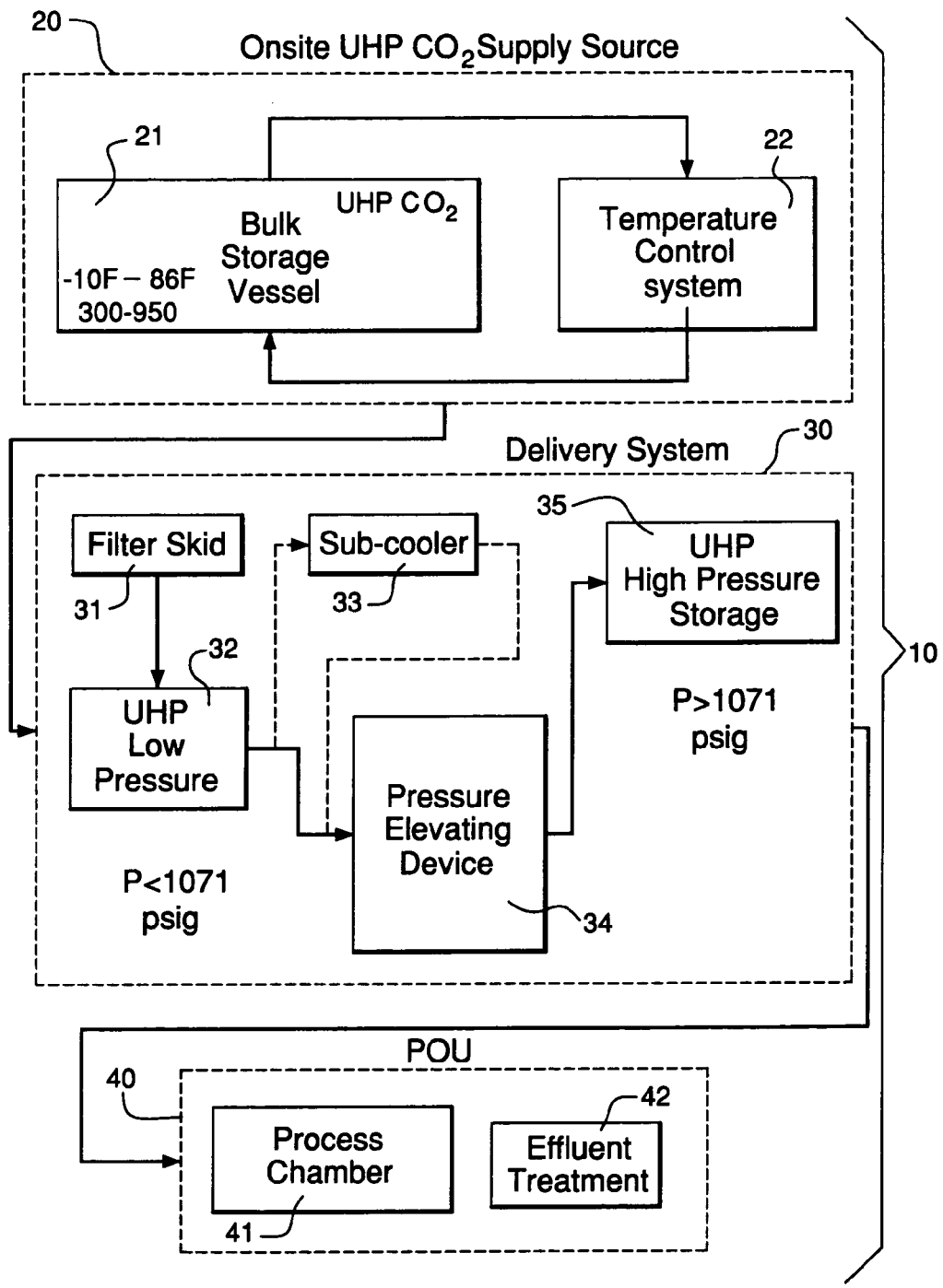
FIG. 1 provides an example of one embodiment of the system of the present invention without purification and without recycle of spent carbon dioxide stream.

FIG. 1 represents a system that does not include purification between the carbon dioxide source and carbon dioxide supply systems. In this system, the carbon dioxide feed is delivered meeting at least the minimum purity requirements demanded by at least one process tool within the system. Carbon dioxide feed may comprise at least 80% or greater, at least 90% or greater, or at least 95% or greater carbon dioxide. Referring to FIG. 1, system 10 has a carbon dioxide source 20 that is used for storage of bulk $CO_2$ that is delivered to a site. Carbon dioxide source 20 also includes one or more bulk storage vessels 21 equipped with an optional temperature control system 22. Bulk storage vessel 21 may contain large quantities, for example, 700 lbs (2650 liters) or greater, of a purified carbon dioxide feed, i.e., a carbon dioxide feed that does not require purification prior to delivering to the carbon dioxide delivery system. In other embodiments, bulk storage vessel 21 may be, for example, a liquid carbon dioxide tank, a railroad tank car, or a truck tailor. Bulk storage vessel 21 is preferably a pressurized vessel.

Bulk storage vessel 21 may have an optional temperature control system 22 to maintain a certain temperature of the carbon dioxide feed. The temperature of the carbon dioxide feed inside the bulk storage vessel 21 can vary but is preferably maintained in the range from −15° F. to 86° F.

(−26° C. to 30° C.) or from −10° F. to 10° F. (−23° C. to −12° C.). Temperature is maintained by means of sufficient vessel insulation or by a refrigeration/heating system proximal to or incorporated within bulk storage vessel 21 (not shown). Bulk storage vessel 21 is also equipped via pressure control valves, heaters, chillers, heat exchangers, or other means to maintain the pressure of the purified carbon dioxide feed at a first pressure which can vary but is generally below the required pressure, below 1,071 psig, or may range from 300 to 950 psig. Carbon dioxide source 20 may also include, but is not limited to, other elements such as supply piping, pressure control valves, safety valves, etc. that may be tailored to suit end-user needs. These elements may be used, for example, to change the temperature, flow rate, pressure, physical state, or other aspects of the carbon dioxide feed. Carbon dioxide source 20 may also include a vaporizer (not shown) when gas delivery is required and or/additional purification system is required, etc. In alternative embodiments, one or more vaporizers can be incorporated into either the first and/or the second purification system.

Figure 2:
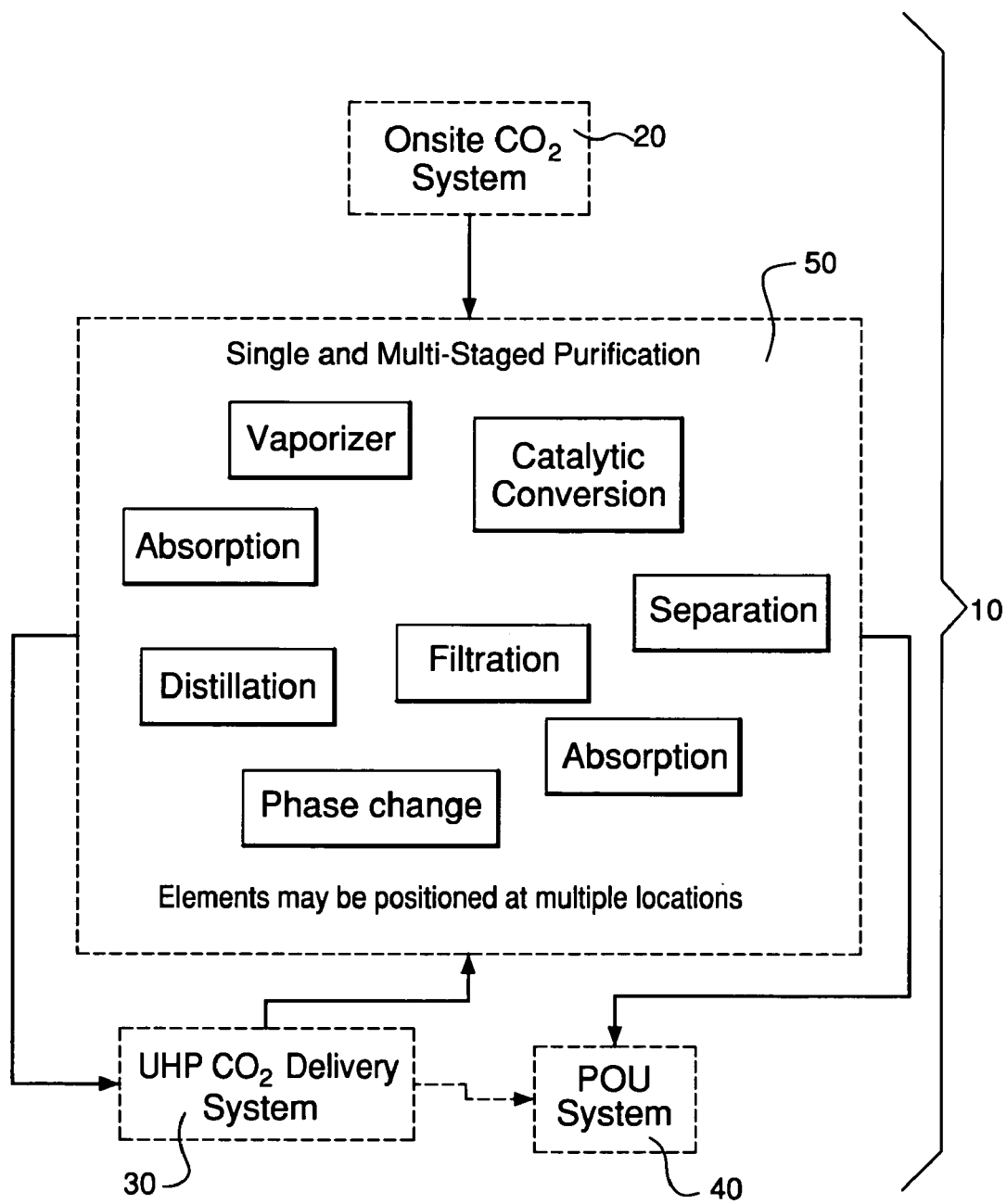
FIG. 2 provides an example of an alternative embodiment of the system of the present invention with a first purification system that is in fluid communication with the carbon dioxide source, carbon dioxide delivery system, and the at least one process tool.

FIG. 2 provides an alternative embodiment wherein the carbon dioxide feed from carbon dioxide source 20 is an unpurified carbon dioxide feed or does not meet the minimum purity requirements of at least one process tool. FIG. 2 provides a first purification system 50 that is used to process the unpurified carbon dioxide feed prior to delivery to carbon dioxide delivery system 30. Purification system 50 may support a number of different POU systems 40 having a number of applications with different purity requirements for the purified carbon dioxide product stream. The purification devices may be arranged in parallel to address the removal of certain contaminants or in series to provide different levels of purification.

Purification system 50 may contain at least one purification device or purifier. Exemplary purification devices include, but are not limited to, an absorptive bed, a phase change device, a filtration bed, a catalytic oxidizer, a vaporizer, a distillation column, a phase separator, liquefaction means, a centrifuge, a condensor, a solid contaminant purifier or a fluid contaminant purifier. These purification devices may be used alone or in combination with each other. A vaporizer may be used for single-stage or multistage removal of higher-relative-volatility contaminants as vapor from a liquid carbon dioxide feed, product, or partially purified feed or product. A condenser may be used for single-stage or multi-stage removal of lower-relative-volatility contaminants from a vapor carbon dioxide input feed, product, or partially purified feed or product. An adsorptive bed may be used for the removal of certain contaminants by the selective adsorption of contaminants from the carbon dioxide feed, product, or partially purified feed or product, or alternatively, selective adsorption of the carbon dioxide feed, product, or partially purified feed or product and subsequent desorption. An absorption bed may be used for removing contaminants by selective absorption of contaminants from the input stream or alternatively, selective absorption of the carbon dioxide feed, product, or partially purified feed or product and subsequent desorbtion. Removal of contaminants can also be accomplished by reactive conversion of the contaminants from a carbon dioxide feed, product, or partially purified feed product by means entailing use of temperature control, reactive species, catalytic materials, or combination thereof. Removal of contaminants can also be accomplished by reactive conversion of the contaminants to another chemical component, which is more easily separated from the carbon dioxide product, by means entailing use of temperature control, reactive species, catalytic materials, or combination thereof and then subsequently removing the chemical component by using any of the purification devices described herein. Removal of contaminants in solid-phase from a liquid-phase or vapor-phase carbon dioxide feed, product, or partially purified feed or product by mechanical means, referred to herein as "solid contaminant purifiers", include, but are not limited to, filtration, crystallization, gravity separation, centrifugal separation or expression, or combinations thereof. Removal of contaminants in vapor-phase or liquid phase from solid-phase carbon dioxide feed, product, or partially purified feed or product by mechanical means, referred to herein as "fluid contaminant purifiers", include, but are not limited to, filtration or gravity separation, centrifugal separation or expression, or combinations thereof.

First purification system 50 may be a central purification system to process an unpurified carbon dioxide feed such as that shown in FIG. 2. In certain embodiments, a single purification system such as first purification system 50 may be employed when one or more POU systems require the same purification levels. In these embodiments, first purification system may be located in one central location as shown.

Figure 3:
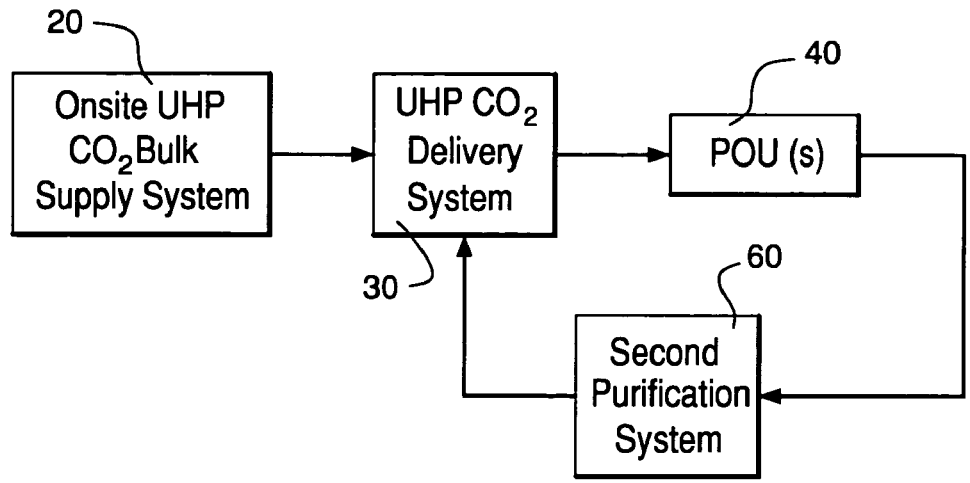
FIG. 3 provides an example of an alternative embodiment of the system of the present invention wherein the spent carbon dioxide stream is recycled.
Figure 4:
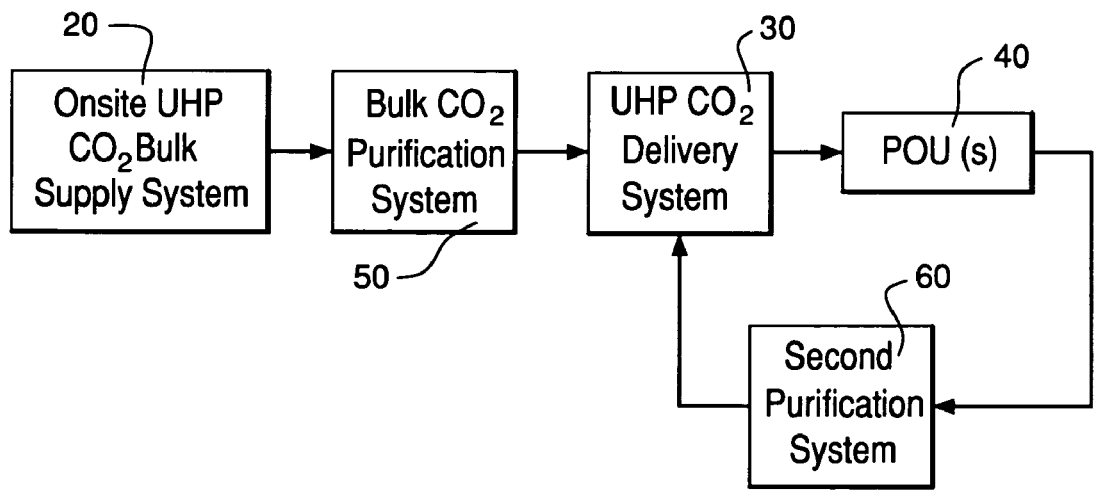
FIG. 4 provides an example of an alternative embodiment of the system of the present invention having a first purification system in fluid communication with the carbon dioxide source and the carbon dioxide delivery system wherein the spent carbon dioxide stream is recycled.

In other embodiments, one or more additional purification systems or downstream purification systems, such as the second purification system 60 shown in FIGS. 3 and 4, may be used. Second purification system 60 may be used alone, such as the system shown in FIG. 3, or in addition to the first purification system 50, such as the systems shown in FIGS. 4 and 5.

Second purification system 60 may support a number of different POU systems 40 having a number of process tools contained therein with varying purity requirements for the purified carbon dioxide product stream. Like first purification system 50, second purification system 60 may contain at least one purification device or purifiers. Examples of suitable purifications devices include, but are not limited to, an absorptive bed, a phase change device, a filtration bed, a catalytic oxidizer, a vaporizer, a distillation column, a phase separator, liquefaction means, a centrifuge, a solid contaminant purifier or a fluid contaminant purifier. These purification devices may be used alone or in combination with each other. The purification devices may be arranged in parallel to address the removal of certain contaminants or in series to provide different levels of purification. In certain preferred embodiments, second purification system 60 handles a smaller capacity of input, i.e., spent carbon dioxide stream or a partially purified carbon dioxide feed or product.

Figure 5:
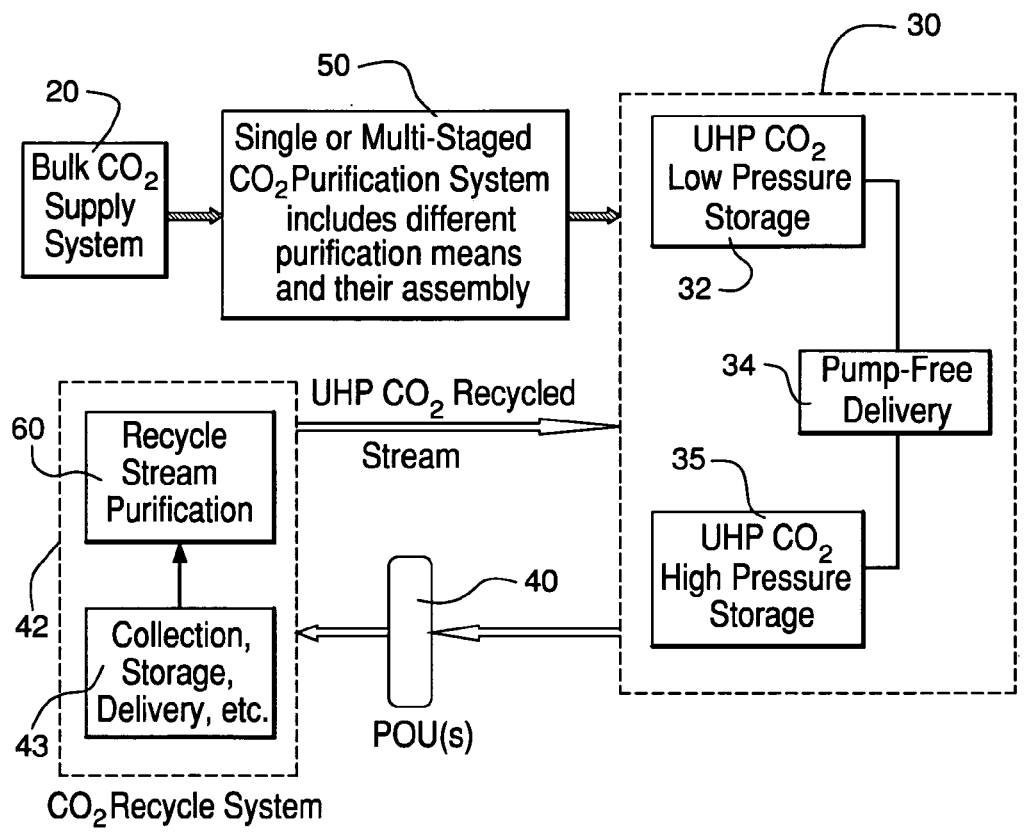
FIG. 5 provides an example of an alternative embodiment of the system of the present invention having a first purification system in fluid communication with the carbon dioxide source and the carbon dioxide delivery system and a second purification system in fluid communication with the carbon dioxide delivery system and the at least one process tool wherein the spent carbon dioxide stream is recycled.

In certain instances, second purification system 60 could be a decentralized purification system within the POU sub-system that may be used, for example, to remove specific contaminants from the spent carbon dioxide stream and/or the partially purified carbon dioxide product stream such as the system shown in FIG. 5.

Yet another alternative for the purification system is a stage purification system wherein the unpurified carbon dioxide feed is purified to a certain level, for example, a partially purified carbon dioxide feed having a purity level that may be, for example, the minimum purity level of the least one process tool 41 within the manufacturing facility. Prior to delivery, the partially purified carbon dioxide stream may be passed through a second, third, or $n^{th}$ purification system prior to use within the at least one process tool 41 to meet the purity needs of a particular application.

Referring to FIG. 1, carbon dioxide delivery system 30 provides all necessary means to deliver the purified carbon dioxide feed from the carbon dioxide source 20 to the at least one process tool 41 at point of use system 40. Delivery system 30 takes the purified carbon dioxide feed from the bulk storage vessel 21 and delivers it as a purified carbon dioxide product stream to the at least one process tool 41 at the required pressure, temperature, physical state, flow rate, or other process parameter. Carbon dioxide delivery system 30 may include an optional filter skid 31, one or more optional low pressure storage vessels 32, an optional sub-cooler 33 in fluid communication with pressure elevating device 34, and one or more optional high pressure storage vessels 35. Delivery system 30 may also include, but is not limited to, pumps, filters, chillers, heat exchangers, vaporizers, product distribution lines, pressure vessels, etc. In certain embodiments, a plurality of low pressure and high pressure storage vessels 32 and 35 may be employed to allow for an uninterrupted supply of the purified carbon dioxide product stream to the point of use system 40. In other embodiments, pressure elevating device 34 may include vessels within the system that may obviate the need for low and high pressure storage vessels 32 and 35.

Referring to FIG. 1, optional low pressure storage vessel 32 is located upstream of pressure-elevating device 34 and preferably contains the purified carbon dioxide feed at one or more pressures up to 1070 psig. In addition, optional low pressure storage vessel 32 is also designed to preserve specified $CO_2$ purity. In this connection, optional low pressure storage vessel 32 contains a sufficient inventory of purified carbon dioxide feed to provide an uninterrupted supply to one or more pressure-elevating device(s) 34 supplying one or more process tools 41 at point of use system 40 without deleterious variation in supply pressure and without additional special considerations for flow variation upstream of delivery system 30. In certain embodiments, vessel 32 may be used to supply the purified carbon dioxide feed to a pressure-elevating device(s) 34 where it is transformed to a purified carbon dioxide product stream and delivered to the at least one process tool 41 without the use of any additional transporting means, e.g. pumps, compressors, etc.

Referring again to FIG. 1, optional high pressure storage vessel 35 is located downstream of pressure-elevating device 34 and preferably contains product with one or more pressures above the critical point pressure of carbon dioxide, e.g. from 1072 psig up to 10,000 psig, and/or above the required pressure at least one process tool 41. In addition, optional high-pressure storage vessel is also designed to preserve specified $CO_2$ purity. Optional high-pressure storage vessel 35 contains sufficient inventory of a purified carbon dioxide product stream to provide an uninterrupted supply to at least one process tool 41 without deleterious variation in supply pressure and without additional special consideration for flow variation upstream of the UHP delivery system 30. Vessel 35 is used to supply the carbon dioxide product to the at least one process tool without the use of any additional transporting means, e.g., pumps, compressors, etc. In certain embodiments, the pressure of the purified carbon dioxide product stream is at a pressure higher than the required pressure. In these embodiments, the pressure difference between vessel 35 and the POU system 40 may be used to transport the carbon dioxide product stream to the at least one process tool 41.

Delivery system 30 may include filter skid 31, which is used when, for example, pressure elevating device 34 includes moving parts, e.g., pumps, compressors, valves. Delivery system 30 may also include a sub-cooler 33 that can be used to minimize $CO_2$ flashes, such as an unintended partial conversion of liquid into vapor, between the pressure elevating device 34 and the POU system 40 and between carbon dioxide source 20 and elements of pressure elevating device 34 such as, for example, pump(s), compressor(s), etc.

Figure 6:
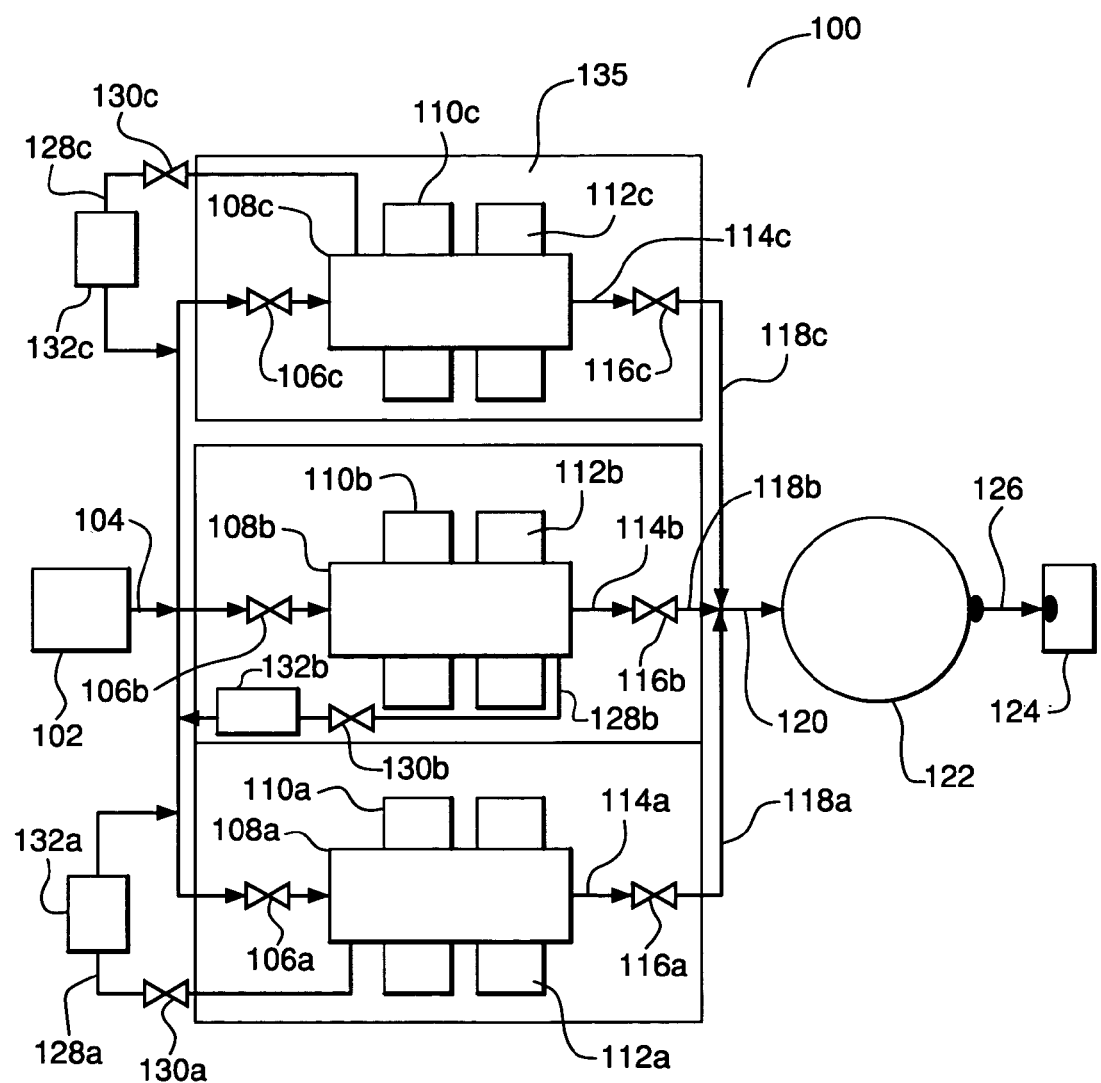
FIG. 6 provides an example of a specific embodiment of the system of the present invention.

Pressure elevating device 34 is used to increase the purified carbon dioxide feed pressure from a first pressure to a second pressure, which is a pressure that is equal to or greater than the required pressure. Pressure elevating device 34 may consist of a single pump or plurality of pumps, compressors, etc. In alternative embodiments, pressure elevating device 34 may utilize a pump-free system such as the apparatuses disclosed in pending patent applications, U.S. patent application Ser. No. 10/351,188, filed 28 Jan. 2003, and U.S. patent application Ser. No. 10/753,315, filed 9 Jan. 2004, which are commonly assigned to the assignee of the present invention and incorporated herein by reference in their entirety, for pressurization of the purified carbon dioxide feed. FIGS. 5 and 6 provide examples of systems having a pump-free pressure elevating device 34. In these embodiments, no rotating or oscillating parts are present which can contribute to product contamination due to particle shedding. Therefore, filtration and other purification means can be either partially or completely omitted. In addition, the pump-free system may include sufficient product inventory thereby eliminating the need for low and high pressure storage vessels 32 and 35.

Point of Use (POU) system 40 includes at least one process tool 41, or the equipment used to process an article, and optionally a spent carbon dioxide stream treatment system 42. Carbon dioxide delivery system 30 delivers a purified carbon dioxide product stream at the required pressure and other process parameters to the at least one process tool 41 wherein the purified carbon dioxide stream is used to process an article. The terms "processed" or "processing" as used herein means contacting an article with a purified carbon dioxide product stream to effect physical and/or chemical changes to the article. The term "processing" may include, for example, film stripping, cleaning, drying, etching, planarization, deposition, extraction, photoresist development, formation of suspended nano-particles and nano-crystals, etc. The term "article" as used herein means any article of manufacture that can be contacted with purified carbon dioxide product stream. Representative articles may include, but are not limited to, silicon or gallium arsenide wafers; reticles; photomasks; flat panel displays; internal surfaces of processing chambers; printed circuit boards; surface mounted assemblies; electronic assemblies; sensitive wafer processing system components; electro-optical, laser and spacecraft hardware; surface micro-machined systems; and other related articles subject to contamination during fabrication. The same processing step can be conducted using multiple process tools that can be operated independently of the others. The at least one process tool can include one or more chambers and each chamber can independently process its own article or batch of articles. In certain embodiments, the POU system may contain, but not be limited to, a number of process tools from the same processing step, or alternatively, a number of process tools from a different processing step that requires the same $CO_2$ purity.

The at least one process 41 receives the purified carbon dioxide product stream at a required pressure for use in its process and, after processing with the purified carbon dioxide product stream, generates a spent carbon dioxide stream. Spent carbon dioxide stream may contain a variety of contaminants depending upon the processing step conducted. The types of contaminants contained within the spend carbon dioxide stream may vary but may include, for example, dissolved gases such as, for example, $H_2O$, $O_2$, COS, CO, $H_2S$; organic compounds such as exposed photoresist material, photoresist residue, UV- or X-ray-hardened photoresist, C—F-containing polymers, low and high molecular weight polymers, and other organic etch residues; inorganic compounds such as metal oxides, ceramic particles from CMP slurries and other inorganic etch residues; metal containing compounds such as organometallic residues and metal organic compounds; ionic and neutral, light and heavy inorganic (metal) species, moisture, and insoluble materials, including particles generated by planarization and sputter etch processes.

In embodiments such as the systems shown in FIGS. 1, 4, and 5, POU system 40 further includes a spent carbon dioxide treatment system 42 and/or second purification system 60. Treatment system 42 may process the spent carbon dioxide stream coming from at least one process tool 41 and release it in environmentally friendly manner to atmosphere or, alternatively, deliver it to a storage vessel 43 for later reuse in different applications or different industries wherein the purity level of the treated stream does not need to be a high purity or UHP levels. In certain embodiments, the spent carbon dioxide stream may be treated and then released as a waste stream such as the system shown in FIG. 1. In alternative embodiments such as the systems in FIGS. 3, 4, and 5, the spent carbon dioxide stream may be recycled by purifying it in one or more purification systems, such as second purification system 60 shown, to provide a purified carbon dioxide product stream prior to reuse in POU system 40.

The purified carbon dioxide product stream can be delivered to POU system 40 in a variety of different fluid states such as, for example, high-pressure liquid or supercritical fluid. In certain embodiments, the purified carbon dioxide product stream can be delivered to POU system 40 as a liquid. In these embodiments, the liquid product stream should have a pressure above the $CO_2$ critical pressure and a temperature below the $CO_2$ critical temperature. A liquid delivery system may optionally include an energy source such as a thermal source to convert the delivered liquid carbon dioxide product into a supercritical carbon dioxide product. In certain embodiments, the thermal source may be an integral part of at least one process tool 41 or may be part of carbon dioxide delivery system 30. In alternative embodiments, purified carbon dioxide product stream can be delivered to POU system 40 as a supercritical fluid. In these embodiments, the at least one energy source can be incorporated into carbon dioxide delivery system 30 rather than as part of the at least one process tool 41. When the carbon dioxide product is in its supercritical state, it is preferably that the distance between carbon dioxide delivery system 30 and the at least one process tool 41 be relatively short. For this purpose, the at least one energy source can supporting one or a cluster of process tools and can be located on at the particular POU system for the particular process near the process tool(s) location.

The purified carbon dioxide stream can be further combined with one or more processing agents prior to delivery to the POU system 40. A processing agent is defined as a compound or combination of compounds that promotes physical and/or chemical changes to an article or upon contact with a purified carbon dioxide product stream containing same. In certain instances, it can also enhance the cleaning ability of the purified carbon dioxide product stream to remove contaminants from a contaminated article. Further, the processing agent may solubilize and/or disperse the contaminant within the purified carbon dioxide product stream. These processing agents may include, for example, film strippers, cleaning or drying agents, entrainers such as surfactants, chelating agents, etching or planarization reactants, photoresist developers, and deposition materials or reactants.

FIG. 6 provides an example of a particular embodiment of an apparatus and system of the present invention, 100, wherein the pressure elevating device 135 comprises a pump-free system. In operation, a stream of gaseous or liquid feed containing carbon dioxide at initial delivery parameters, for example, liquid carbon dioxide at 300 psig at −5° F. (about −20° C.), is delivered to a low pressure storage vessel 102 from a carbon dioxide source (not shown). The gaseous or liquid feed is preferably purified prior to introducing the feed into vessel 102 to provide a purified carbon dioxide feed, such as, for example by purifying in the first purification system (not shown). The purified carbon dioxide feed then is removed from vessel 102 by means of line 104, passed through valves 106a, 106b, or 106c and then to vessels 108a, 108b, or 108c respectively. Vessels 108a, 108b, or 108c are used for the generation of a slush or a solid phase carbon dioxide feed. The term "slush" as used herein relates to a multiphase mixture of the at least one component that may contain solid, liquid, and vapor phases, preferably solid and liquid phases, of carbon dioxide. The carbon dioxide feed may be at least partially solidified in these vessels, i.e., vessels 108a, 108b, or 108c, with the help of optional chillers 110a, 110b, or 110c respectively.

The function of the chillers is to simply lower the temperature of the carbon dioxide inside vessels 108a, 108b, or 108c to a temperature equal or below the carbon dioxide solidification point. In alternative embodiments such as when the carbon feed is delivered in liquid form, chillers 110a, 110b, or 110c may not be necessary and sudden expansion of the feed stream by reducing the pressure to a pressure that is below the pressure of the incoming feed stream can be used to form a solid-vapor or a liquid-vapor for solid phase source or slush generation in vessels 108a, 108b, or 108c. As solid carbon dioxide is formed, additional carbon dioxide feed from tank 102 is added to the respective vessels 108a, 108b, or 108c until that vessel is substantially, or preferably completely, filled with solid carbon dioxide or preferably with a solid-liquid mixture of carbon dioxide, i.e., slush. At that time, vessel 108a, 108b or 108c is isolated from tank 102 by closing appropriate valve 106a, 106b, or 106c.

To effect conversion of solid phase source carbon dioxide to a fluid product and pressurization thereof, the apparatus may incorporate at least one energy source such as, for example, heaters 112a, 112b, or 112c. These heaters, which are attached or built into the respective vessels 108a, 108b or 108c, are activated for heating and effecting the melting of the solid form of the carbon dioxide. In other embodiments, at least one energy source, besides or in addition to thermal energy (i.e., heaters), such as, for example, radiation, microwave, ultrasonic, laser or other sources may be used to covert at least portion of the solid phase source to a fluid product. Conversion of solid carbon dioxide to a fluid product may occur within isochoric conditions, i.e., maintaining a constant volume of the heated vessel. Isochoric heating of the high density substance, such as, for example, solid or slush carbon dioxide, provides the mechanism to increase the pressure of the resulting carbon dioxide fluid product to any pressure desired in the process and to deliver a lower density substance, such as for example, a fluid product such as liquid carbon dioxide, to the point of use (POU) at the required pressure. This pressure increase can be obtained without effecting a substantial change in the average slush temperature or internal temperature of carbon dioxide within the vessel. Operating over a narrow temperature range may allow for efficient use of the at least one energy source.

Fluid product can be withdrawn from vessels 108a, 108b and 108c via lines 114a, 114b and 114c and passed through pressure control valves 116a, 116b and 116c, respectively. Pressure control valves 116a, 116b and 116c maintain a controlled pressure within vessels, 108a, 108b, or 108c. The controlled pressure could be a constant or fixed pressure or could be oscillated, for example, to generate a slush. The fluid product can be transported via lines 118a, 118b and 118c respectively via line 120 and to an optional surge tank 122. The fluid product can be delivered to the at least one process tool 124 via line 126 and/or from optional surge tank 22 at a required pressure, as for example, between 300 and 10,000 psig, and at a delivery temperature below the critical temperature, i.e., the highest temperature at which distinct vapor and liquid phases can coexist for the carbon dioxide, e.g., 77° F. (or 25° C.), which is below the critical temperature of $CO_2$ or 87.9° F. (or 31.1° C.).

Since the density of the solid carbon dioxide is approximately 1.5 times greater then that of carbon dioxide in the liquid state, a significant volume of a carbon dioxide can be removed from vessel 108a, 108b or 108c at any preselected pressure. Liquid carbon dioxide product can be removed from each vessel at a rate, which is generally equal to the melting rate of the solid carbon dioxide within each vessel 108a, 108b or 108c. In this connection, the removal of liquid carbon dioxide product from each vessel may be immediately replaced with liquid carbon dioxide formed on conversion of the solid carbon dioxide to liquid carbon dioxide. By effecting withdrawal of liquid carbon dioxide at a rate substantially equal to the rate of formation of liquid carbon dioxide, the pressure inside vessels 108a, 108b or 108c can be maintained at a desired pressure that is a pressure at or above the required pressure. Withdrawal of liquid carbon dioxide from the process is terminated when the solid phase carbon dioxide is substantially or completely converted to liquid.

In alternative embodiments, a three phase slush, i.e. a mixture of solid, liquid, and vapor, can coexist inside vessels 108a, 108b, and 108c. The presence of the vapor phase contained therein may take more time and energy to reach relatively high pressures due to its compressibility. At higher pressures, there may be no vapor phase left because it condenses into the liquid phase. Several loops, as shown in the three unit system can be used to provide continuous flow of a purified carbon dioxide product stream to optional high pressure storage vessel 122. Each loop typically will be operated with a cycle shifted in time relative to the neighboring loop.

FIG. 6 also includes a recycle flow network for the removal, purification, and recycling of effluent vapor contained within vessels 108a, 108b, and 108c shown. Vessels 108a, 108b, and 108c are in fluid communication with lines 128a, 128b, and 128c, respectively. Lines 128a, 128b, and 128c further include valves 130a, 130b, and 130c. However, in other embodiments, effluent vapor can be withdrawn, for example, through pressure control valves 116a, 116b, and 116b. In the embodiment shown in FIG. 6, effluent vapor from vessels 108a, 108b, and 108c is recycled and reintroduced into vessels 108a, 108b, and 108c through valves 106a, 106b, and 106c. In this embodiment, lines 128a, 128b, and 128c or the recycle flow network may also include at least one purifying device 132a, 132b, and 132c, such as, but not limited to, a filter, a distiller, an adsorbent bed, a scrubber, or other device suitable for removing contaminants from the effluent vapor. In other embodiments, however, effluent vapor may be vented from vessels 108a, 108b, and 108c rather than recycled.

While this invention has been particularly shown and described with references to particular embodiments thereof, it will be understood by those skilled in the art that various changes in form and details may be made therein without departing from the scope of the invention encompassed by the appended claims.

We claim:

1. A system for supplying a carbon dioxide product stream to at least one process tool at a required pressure at at least one application, the system comprising:
   (a) a carbon dioxide source comprising a bulk storage vessel having a carbon dioxide feed that is selected from a purified carbon dioxide feed or an unpurified carbon dioxide feed wherein the pressure of the carbon dioxide feed within the vessel is at a first pressure which is below a critical pressure of carbon dioxide and is below the required pressure; and
   (b) at least one application, wherein each of the at least one application comprises:
      (i) a carbon dioxide delivery system in fluid communication with the carbon dioxide source and the at least one process tool comprising a pressure elevating device that increases the pressure of at least a portion of the carbon dioxide to provide a carbon dioxide product stream at a second pressure that is equal to or greater than the required pressure;
      (ii) at least one process tool wherein the at least one process tool receives the purified carbon dioxide product stream at the required pressure and converts at least a portion of the purified carbon dioxide product stream to a spent carbon dioxide stream; and
      (iii) an application-specific purification system in direct fluid communication with the carbon dioxide delivery system and the at least one process tool wherein the application-specific purification system converts at least a portion of the spent carbon dioxide stream to a purified carbon dioxide product stream prior to delivery to the at least one process tool.

2. The system of claim 1 further comprising a first purification system in fluid communication with the carbon dioxide source and the carbon dioxide delivery system of the at least one application, wherein the first purification system converts at least a portion of the unpurified carbon dioxide feed to a purified carbon dioxide feed prior to delivery to the carbon dioxide delivery system of the at least one application.

3. The system of claim 2 wherein the first purification system has at least one purifier selected from an adsorptive bed, a filtration bed, a catalytic oxidizer, a vaporizer, a distillation column, a phase separator, a liquefaction means, a centrifuge, an absorptive bed, a solid contaminant purifier, a fluid contaminant purifier, and combinations thereof.

4. The system of claim 1 wherein the application-specific purification system comprises at least one purifier selected from an adsorptive bed, a filtration bed, a catalytic oxidizer, a vaporizer, a distillation column, a phase separator, a liquefaction means, a centrifuge, an absorptive bed, a solid contaminant purifier, a fluid contaminant purifier, and combinations thereof.

5. The system of claim 1 wherein the carbon dioxide product stream at a second pressure is a supercritical fluid.

6. The system of claim 1 wherein the purified carbon dioxide product stream is a liquid.

7. The system of claim 1 wherein the bulk storage vessel contains a purified carbon dioxide feed.

8. The system of claim 1 wherein the carbon dioxide delivery system further comprises a high pressure storage vessel that stores at least a portion of the purified carbon dioxide feed at the second pressure.

9. The system of claim 8 wherein the pressure elevating device delivers at least a portion of the carbon dioxide feed at the second pressure to the high pressure storage vessel.

10. The system of claim 1 wherein the carbon dioxide delivery system further comprises a low pressure storage vessel that stores at least a portion of the purified carbon dioxide feed at the first pressure.

11. The system of claim 1 wherein the pressure elevating device is free of mechanical pumps and provides the carbon dioxide product stream at the second pressure.

12. The system of claim 1 wherein the spent carbon dioxide stream is vented.

13. A system for supplying a carbon dioxide product stream to at least one process tool at a required pressure, the system comprising:
(a) a carbon diQxide source comprising:
  (i) a bulk storage vessel having an unpurified carbon dioxide feed wherein the pressure of the unpurified carbon dioxide feed within the vessel is at a first pressure which is below the critical pressure of carbon dioxide and is below the required pressure;
  (ii) optionally a temperature control system wherein the temperature control system maintains the carbon dioxide feed within the vessel at one or more temperatures ranging from about −23° C. to about 30° C.; and
  (ii) optionally a vaporizer;
(b) a first purification system that is in fluid communication with the carbon dioxide source and a carbon dioxide delivery system wherein the first purification system converts at least a portion of the unpurified carbon dioxide feed to a purified carbon dioxide feed prior to delivery to the carbon dioxide delivery system; and
(c) at least one application, wherein each of the at least one application comprises:
a carbon dioxide delivery system in fluid communication with the carbon dioxide source and the at least one process tool comprising:
  (i) optionally a low pressure storage vessel that stores at least a portion of the purified carbon dioxide feed at the first pressure; and
  (ii) a pressure elevating device that increases the pressure of the at least a portion of the purified carbon dioxide feed to provide at least one selected from a purified carbon dioxide product stream or a partially purified carbon dioxide product stream wherein the purified carbon dioxide product stream and the partially purified product stream are at a second pressure that is at or above the required pressure
at least one process tool wherein the at least one process tool receives the purified carbon dioxide product stream at the required pressure and converts at least a portion of the purified carbon dioxide product stream to a spent carbon dioxide stream; and
an application-specific purification system in direct fluid communication with the carbon dioxide delivery system and the at least one process tool wherein the application-specific purification system converts at least a portion of the spent carbon dioxide stream to a purified carbon dioxide product stream prior to delivery to the at least one process tool.

14. A process for delivering a carbon dioxide product stream to at least one process tool at a required pressure, the process comprising:
providing the system of claim 1 wherein the bulk storage vessel has a purified carbon dioxide feed contained therein wherein the purified carbon dioxide feed is at a first pressure which is below the critical pressure of carbon dioxide and is below the required pressure and wherein the temperature of the carbon dioxide is at one or more temperatures ranging about −23° C. to about 30° C.;
delivering at least a portion of the purified carbon dioxide feed to a vessel that stores at least a portion of the purified carbon dioxide feed at the first pressure;
converting at least a portion of the purified carbon dioxide feed contained within the second vessel to a solid phase carbon dioxide;
converting at least a portion of the solid phase carbon dioxide to the purified carbon dioxide product stream until a second pressure is reached wherein the second pressure is at or above the required pressure;
maintaining the second pressure within the second vessel; and
delivering the purified carbon dioxide product stream to the at least one process tool at the required pressure wherein the at least one process tool converts at least a portion of the purified carbon dioxide product stream to a spent carbon dioxide stream.

15. The process of claim 14 wherein the first converting step comprises reducing a pressure of the purified carbon dioxide feed below the triple-point pressure of carbon dioxide.

16. The process of claim 14 wherein the first converting step comprises reducing a temperature of the purified carbon dioxide feed contained within the second vessel.

17. The process of claim 14 wherein the second converting step comprises applying an energy source to the solid phase carbon dioxide.

18. The process of claim 17 wherein energy source is at least one selected from the group consisting of thermal, microwave, radiation, ultrasonic, sonic, laser, and mixtures thereof.

19. A system for supplying a carbon dioxide product stream to at least one process tool at a required pressure at a plurality of applications, the system comprising:
(a) a carbon dioxide source comprising a bulk storage vessel having a carbon dioxide feed that is selected from a purified carbon dioxide feed or an unpurified carbon dioxide feed wherein the pressure of the carbon dioxide feed within the vessel is at a first pressure which is below a critical pressure of carbon dioxide and is below the required pressure; and
(b) a plurality of applications, wherein each of the plurality of applications comprises:
  (i) a carbon dioxide delivery system in fluid communication with the carbon dioxide source and the at least one process tool comprising a pressure elevating device that increases the pressure of at least a portion of the carbon dioxide to provide a purified carbon dioxide product stream at a second pressure that is equal to or greater than the required pressure;
  (ii) at least one process tool wherein the at least one process tool receives the purified carbon dioxide product stream at the required pressure and converts at least a portion of the purified carbon dioxide product stream to a spent carbon dioxide stream; and (iii) an application-specific purification system in direct fluid communication with the carbon dioxide delivery system and the at least one process tool wherein the application-specific purification system converts at least a portion of the spent carbon dioxide stream to a purified carbon dioxide product stream prior to delivery to the at least one process tool.

20. The system of claim 19 further comprising a first purification system in fluid communication with the carbon dioxide source and the carbon dioxide delivery system of each of the plurality of applications, wherein the first purification system converts at least a portion of the unpurified carbon dioxide feed to a purified carbon dioxide feed prior to delivery to the carbon dioxide delivery system of each of the plurality of applications.

21. The system of claim 20 wherein the first purification system has at least one purifier selected from an adsorptive bed, a filtration bed, a catalytic oxidizer, a vaporizer, a distillation column, a phase separator, a liquefaction means, a centrifuge, an absorptive bed, a solid contaminant purifier, a fluid contaminant purifier, and combinations thereof.

22. The system of claim 19 wherein the application-specific purification system has at least one purifier selected from an adsorptive bed, a filtration bed, a catalytic oxidizer, a vaporizer, a distillation column, a phase separator, a liquefaction means, a centrifuge, an absorptive bed, a solid contaminant purifier, a fluid contaminant purifier, and combinations thereof.

23. The system of claim 19 wherein the carbon dioxide product stream at a second pressure is a supercritical fluid.

24. The system of claim 19 wherein the purified carbon dioxide product stream is a liquid.

25. The system of claim 19 wherein the bulk storage vessel contains a purified carbon dioxide feed.

26. The system of claim 19 wherein the carbon dioxide delivery system further comprises a high pressure storage vessel that stores at least a portion of the purified carbon dioxide feed at the second pressure.

27. The system of claim 26 wherein the pressure elevating device delivers at least a portion of the purified carbon dioxide feed at the second pressure to the high pressure storage vessel.

28. The system of claim 19 wherein the carbon dioxide delivery system further comprises a low pressure storage vessel that stores at least a portion of the purified carbon dioxide feed at the first pressure.

29. The system of claim 19 wherein the pressure elevating device is free of mechanical pumps and provides the carbon dioxide product stream at the second pressure.

30. The system of claim 19 wherein the spent carbon dioxide stream is vented.

31. A system for supplying a carbon dioxide product stream to at least one process tool at a required pressure at a plurality of applications, the system comprising:
(a) a carbon dioxide source comprising:
   (iii) a bulk storage vessel having an unpurified carbon dioxide feed wherein the pressure of the unpurified carbon dioxide feed within the vessel is at a first pressure which is below the critical pressure of carbon dioxide and is below the required pressure;
   (ii) optionally a temperature control system wherein the temperature control system maintains the carbon dioxide feed within the vessel at one or more temperatures ranging from about −23° C. to about 30° C.; and
   (iv) optionally a vaporizer;
(b) a first purification system that is in fluid communication with the carbon dioxide source and a carbon dioxide delivery system wherein the first purification system converts at least a portion of the unpurified carbon dioxide feed to a purified carbon dioxide feed prior to delivery to the carbon dioxide delivery system; and
(c) a plurality of applications, wherein each of the plurality of applications comprises:
a carbon dioxide delivery system in fluid communication with the carbon dioxide source and the at least one process tool comprising:
   (i) optionally a low pressure storage vessel that stores at least a portion of the purified carbon dioxide feed at the first pressure; and
   (iii) a pressure elevating device that increases the pressure of the at least a portion of the purified carbon dioxide feed to provide at least one selected from a purified carbon dioxide product stream or a partially purified carbon dioxide product stream wherein the purified carbon dioxide product stream and the partially purified product stream are at a second pressure that is at or above the required pressure
at least one process tool wherein the at least one process tool receives the purified carbon dioxide product stream at the required pressure and converts at least a portion of the purified carbon dioxide product stream to a spent carbon dioxide stream; and
an application-specific purification system in direct fluid communication with the carbon dioxide delivery system and the at least one process tool wherein the application-specific purification system converts at least a portion of the spent carbon dioxide stream to a purified carbon dioxide product stream prior to delivery to the at least one process tool.

* * * * *

UNITED STATES PATENT AND TRADEMARK OFFICE
CERTIFICATE OF CORRECTION

PATENT NO. : 7,076,969 B2  Page 1 of 1
APPLICATION NO. : 10/760771
DATED : July 18, 2006
INVENTOR(S) : Vladimir Yliy Gershtein et al.

It is certified that error appears in the above-identified patent and that said Letters Patent is hereby corrected as shown below:

In the Claims, Column 13, Line 24
    Delete the word "diQxide" and insert the word -- dioxide --.

Signed and Sealed this

Twenty-sixth Day of September, 2006

JON W. DUDAS
*Director of the United States Patent and Trademark Office*